United States Patent [19]

Bauman

[11] 4,224,424

[45] Sep. 23, 1980

[54] PRETREATMENT OF A REACTOR WITH ALKALI METAL CARBONATE AND BICARBONATES TO REDUCE WALL FOULING IN VINYL CHLORIDE POLYMERIZATION

[75] Inventor: Bernard D. Bauman, Plymouth Meeting, Pa.

[73] Assignee: Air Products and Chemicals, Inc., Allentown, Pa.

[21] Appl. No.: 939,020

[22] Filed: Sep. 1, 1978

[51] Int. Cl.³ .............................................. C08F 14/06
[52] U.S. Cl. ..................................................... 526/62
[58] Field of Search ......................................... 526/62

[56] References Cited

U.S. PATENT DOCUMENTS

| | | | |
|---|---|---|---|
| 2,345,659 | 4/1944 | Downes | 526/62 |
| 2,365,506 | 12/1944 | Alexander et al. | 526/62 |
| 3,559,946 | 6/1972 | Koyanagi et al. | 526/344 |
| 3,562,238 | 2/1971 | Parks | 526/344 |
| 3,778,423 | 12/1973 | Reiter | 526/344 |
| 3,842,055 | 10/1974 | Gabriel et al. | 526/344 |
| 3,915,944 | 10/1975 | Burgess et al. | 526/62 |
| 3,926,910 | 12/1975 | Mowdood | 526/344 |
| 3,997,707 | 12/1976 | Aruga et al. | 526/62 |
| 4,024,301 | 5/1977 | Witenhafer et al. | 427/230 |
| 4,024,330 | 5/1977 | Morningstar et al. | 265/62 |
| 4,081,248 | 3/1978 | Cohen | 23/285 |

*Primary Examiner*—Harry Wong, Jr.
*Attorney, Agent, or Firm*—Russell L. Brewer; E. Eugene Innis

[57] ABSTRACT

This invention relates to an improvement for reducing the amount of wall fouling in the suspension polymerization of vinyl chloride in stainless steel reactors. The improvement resides in wetting the reactor surface with a solution containing an alkali metal carbonate or alkali metal bicarbonate or both prior to charging the vinyl chloride recipe to the reactor. The alkaline material is included in a proportion which is effective for reducing wall fouling and typically this concentration is from about 1.25-25 percent for the carbonate and approximately 5-25 percent for the bicarbonate. Preferably, the surface of the reactor, after wetting, is heated to a temperature of about 40-100° C. prior to charging the recipe.

9 Claims, No Drawings

PRETREATMENT OF A REACTOR WITH ALKALI METAL CARBONATE AND BICARBONATES TO REDUCE WALL FOULING IN VINYL CHLORIDE POLYMERIZATION

BACKGROUND OF THE INVENTION

1. Field of the Invention

This invention relates to a method for reducing the wall fouling normally occurring in stainless steel reactors used for the suspension polymerization of vinyl chloride containing monomer systems.

2. Description of the Prior Art

Wall fouling in reactors used for the suspension polymerization of vinyl chloride systems has been a problem, and particularly so in recent years because of the tight constraints imposed on vinyl chloride emission to the atmosphere. Several obvious advantages would be achieved by reducing wall fouling. First, productivity of the reactors could be increased in that the reactors would not have to be taken out of service as often for cleaning. Second, there is less product contamination due to particulate material dropping from the reactor surface into the product.

Some of the techniques used in reducing polymer deposit in the polymerization of vinyl chloride are described in the following patents:

U.S. Pat. No. 3,778,423 discloses a process for reducing polymer deposit in a glass lined reactor by wetting the reactor surface with a solution containing a free radical inhibitor, e.g., a polar organic compound such as alpha-methyl styrene or a chain terminating agent such as an amine, e.g., ethylenediamine tetraacetic acid; fatty acids, an aldehyde such as acrolein, methacrolein and a conjugated diolefin such as isoprene or butadiene.

U.S. Pat. No. 3,562,238 discloses a process for reducing reactor wall fouling in vinyl chloride polymerization by incorporating less than 1,000 ppm (based on the monomers) of magnesium hydroxide in the polymer recipe.

U.S. Pat. No. 3,926,910 discloses a method for reducing reactor wall fouling in vinyl chloride polymerization processes by incorporating from about 0.001 to about 0.02 parts of a nitrite salt per 100 parts monomer onto the reactor surface prior to forming resinous material. The nitrite can be included in the polymerization recipe or sprayed onto the reactor surface as an aqueous solution.

U.S. Pat. No. 3,842,055 discloses a process for reducing reactor wall fouling in the suspension polymerization of vinyl chloride by spraying a fine stream of water in an amount of 20–100% volume of the volume of monomers onto the reactor dome during polymerization.

U.S. Pat. No. 3,669,946 discloses a method for preventing polymer deposition on reactor walls and equipment by coating the surfaces with a polar organic compound such as benzene or ethanol. Example 1 shows applying the solvent to the reactor surfaces and then drying the solvent therefrom. Example 7 in the patent shows that small additions of a caustic soda solution, e.g., in the amount of 0.1% based on vinyl chloride content, give some improvement in reducing polymer deposition.

U.S. Pat. Nos. 4,024,301, 4,024,330 and 4,081,248 discloses the addition of a branched polyaromatic amine such as o-phenylene diamine optionally dilute in alkali metal hydroxide as a coating for the reactor surface.

U.S. Pat. No. 3,997,707 discloses the addition of oxalic acid or its salt to the polymerization recipe in an effort to reduce wall fouling.

SUMMARY OF THE INVENTION

This invention relates to an improved process for reducing reactor wall fouling in the suspension polymerization of a recipe comprising water, vinyl chloride, or a mixture of vinyl chloride and other vinyl monomers copolymerizable therewith, a suspension agent, and a free radical initiator. The improvement for reducing wall fouling in stainless steel reactors comprises wetting the internal reactor surfaces, including turbine blades and shafts, baffles, and cooling coils with a solution comprising a solvent and an effective proportion of an alkaline material selected from the group consisting of alkali metal carbonates and alkali metal bicarbonates prior to charging the recipe to the reactor, the proportion of alkaline material being effective for retarding or reducing the reactor wall fouling. In a preferred embodiment, the reactor surface is contacted with the solution and the reactor surface heated to a temperature of 40°–100° C. for at least 5 minutes prior to charging the recipe.

Although many of the prior art systems are effective for reducing wall fouling, the treatment methods are often difficult to perform and the treating compositions are sometimes quite expensive. In many instances the results, even though the methods were commercially utilized, were marginal.

Several advantages can be achieved by this process, and they include:

a solution, which is relatively inexpensive compared to many prior art systems;

a treatment method which is capable of reducing vinyl chloride polymer deposition in stainless steel reactors to a level at least, if not better, than many of the reported commercially used processes;

a mechanism for reducing polymer deposition utilizing a solution which is relatively noncorrosive to commercial equipment and in addition, relatively easy to handle.

DESCRIPTION OF THE PREFERRED EMBODIMENTS

The present invention is based on the discovery that a solution comprising a solvent and an alkali metal carbonate or an alkali metal bicarbonate, when applied to the internal surface of a stainless steel reactor can effectively reduce the amount of polymer deposition normally associated with the suspension polymerization of vinyl chloride. Representative alkali metal carbonates and alkali metal bicarbonates which are effective are the Group I metal carbonates and bicarbonates and include sodium carbonate, sodium bicarbonate, potassium carbonate, potassium bicarbonate, lithium carbonate, and lithium bicarbonate. Although quite often ammonium carbonate and bicarbonate are viewed as alkali metal carbonates and bicarbonates, or at least equivalent thereto, ammonium carbonate and ammonium bicarbonate are not intended to be included within this definition of alkaline material.

The alkali metal carbonates and bicarbonates are included in the treating solution in an amount sufficient to retard wall fouling. Broadly, the alkali metal carbonate can be used in the concentration of from about 0.5% to its saturation level, typically, 25% by weight of the solution. In a preferred embodiment, the concentration of alkali metal carbonate is from about 1.25 to 10% by weight of the solution. Higher concentrations of alkali metal carbonate do not seem to enhance the effectiveness in terms of reducing wall fouling and merely add to the treatment expense and recovery problem. Alkali metal bicarbonates are not generally as effective as the alkali metal carbonate. However, the reason for this discrepancy is not known. Typically, the concentration of alkali metal carbonate is from about 5–25% by weight of the solution.

Any solvent in which the alkali metal carbonate and bicarbonate is inert and soluble or dispersible therein, can be utilized in practicing this invention. These solvents include lower alkanols having from 1 to 4 carbon atoms, lower alkyl esters, e.g., butyl acetate, ethyl acetate, amides such as dimethylformamide and water. In most situations, though, the solvents that can be used are severely limited. Some, although effective for permitting a reduction polymer deposition may cause polymer degradation or discoloration. Dimethylformamide is an example. For these reasons, it is necessary to determine the effect that any residual solvent may have on the finished polymer in terms of degradation or discoloration. The preferred solvent for use in treating the interior reactor surface is water. It provides desirable results without affecting product quality or affecting polymer degradation or polymer discoloration of the lower alkanols methanol and ethanol are preferred, although these solvents are not as desirable as water.

In some cases it may be preferable to add a small amount of a conventional wetting agent, e.g., a surfactant or emulsifier which is soluble in the solution containing the alkali metal carbonate or alkali metal bicarbonate. The wetting agent or surfactant may enhance the coverage of the reactor surface particularly where there is a polymer deposit on the reactor walls. The decision to use a surfactant generally is based on viewing the coating of the reactor surface and ascertaining the coverage being effected. If the coverage is small, and the treating solution appears to "run off" the polymer surface, then surfactants should be included in the solution. Typically, surfactant concentrations of 0.005–0.5% based on the weight of the solution or as recommended by manufacturers are used. Conventional surfactants include quaternary ammonium aryl halides.

In order to reduce the wall fouling the alkali metal hydroxide solution is applied to the internal reactor surface, including agitator blades, agitator shaft, baffles, and other elements therein in sufficient amount to wet the interior surfaces prior to charging the recipe. The application of the alkali metal carbonate or bicarbonate solution can be conducted in many ways, but the simplest and fastest is to spray the solution directly onto the reactor surfaces. In addition, it normally results in the usage of less material. Alternatively, the reactor can be charged with the alkali metal carbonate or bicarbonate solution and stirred by means of the reactor agitator and then drained. After the internal reactor surfaces have been contacted with the alkali metal carbonate or bicarbonate solution, the excess solution is drained from the reactor. The reactor then in a broad sense is ready to be charged with the vinyl chloride polymerization recipe.

Although the wetting of the internal surface of the stainless steel reactor with the alkali metal carbonate or bicarbonate treating solution can result in reducing polymer deposition in the suspension polymerization of vinyl chloride, it has been found that superior results are obtained if the solution is "baked" onto the surface of the reactor prior to charging the polymer reaction mixture or recipe. Baking of the solution onto the reactor surface is accomplished by heating the reactor to a temperature of from 40°–100° C., and preferably to about 60°–80° C. for at least 5 minutes, and preferably from about 10–30 minutes. Longer baking cycles, i.e., those longer than 30 minutes are not required and do not seem to result in any significant advantages. However, baking cycles of 10 hours may be used without adverse effect. It is possible to heat the reaction surface simultaneously with the spraying of the alkali metal carbonate or bicarbonate onto the reactor surface and to terminate heating after spraying. The better plan is to heat for a few minutes after spraying.

The alkali metal carbonate or bicarbonate treatment is most effective in those conventional vinyl chloride recipe polymerizations where the initial pH of the polymerization is at or above 6.0 and preferably above 7.8. When the initial pH falls below about 7.0 and preferably about 7.8, the recipe acidity may neutralize a substantial proportion of the residual alkali metal carbonate and bicarbonate at the reactor surface and reduce its ability to reduce reactor fouling. With respect to initial pH, this means that the pH of the system itself is above 6.0, and preferably 7.0 to 7.8 at the time of polymerization. Much of the basicity will come from the alkali metal carbonate or bicarbonate remaining in the reactor rather than because of alkali materials being present in the system. This pH limitation is intended to avoid vinyl chloride recipes which incorporate acids or acidic buffers, e.g., phosphoric acid or phosphates to reduce the pH to a value below about 6.0 and even as low as 4.5. In those cases the buffers may react with the alkali metal carbonate or bicarbonate and reduce its effectiveness.

The vinyl chloride recipes which are suspension-polymerized to form a homopolymer or copolymer generally contain water in an amount to provide from about 35–65% solids, from about 0.05%–1.5% a suspending agent, e.g., carboxymethyl cellulose, and preferably hydroxypropyl methyl cellulose, having 42% solution viscosity of from 20–100 cps at 75° F., and from about 0.01–0.5% of a monomer soluble polymerization initiator, e.g., azo bis-valeronitrile, t-butyl perneodecanoates, t-butyl peroxypivalate, lauryl peroxide, etc. Other monomers copolymerizable with vinyl chloride can be added, and these include vinyl acetate, butyl acrylate, ethylene, propylene, diethyl fumarate, and diethyl maleate. Of these, vinyl acetate in an amount of from 5–20% by weight of the polymer formed is preferred. However, it has been found that the best results are obtained with a homopolymer system.

The following examples are intended to illustrate preferred embodiments of the invention and are not intended to restrict the scope thereof. The examples also provide the best modes for practicing the invention.

EXAMPLES 1–24

Because of the difficulty in obtaining reproducibility of data in suspension polymerization processes, particularly with respect to reducing wall fouling in the reactor, several laboratory runs were made with identical polymer recipes in similarly equipped reactors. The results were evaluated based on the number of grams polymer retained, exclusive of a loose material, in the reactor after a set number of batches had been conducted. The evaluation was made after several runs as it was known that the rate of polymer deposition increases with increasing polymer deposit on the reactor walls.

The two laboratory reactors used in the evaluation were Chemco MDX-GJ model 1½ liter 316 stainless steel reactors. The first had an electropolished surface, and the second had a manually polished surface. (The basic difference is in the smoothness of the interior reactor surface, the electropolished surface being much smoother and less susceptible to fouling.) In reactors 1 and 2 the recipes were as follows:

| REACTOR 1 (Electropolished Surface) | |
|---|---|
| Water | 600 grams |
| Vinyl chloride monomer | 300 grams |
| Hydroxypropyl methyl cellulose[1] | 0.27 grams |
| t-butylperoxyneodecanoate[3] | 0.3 ml. |
| Temperature - 59° C. | |
| Agitation Rate - 700 RPM | |
| REACTOR 2 (Manually Polished Surface) | |
| Water | 600 grams |
| Vinyl chloride monomer | 300 grams |
| Hydroxypropyl methyl cellulose[2] | 0.50 grams |
| t-butylperoxyneodecanoate[3] | 0.3 ml. |
| Temperature - 59° C. | |
| Agitation Rate - 700 RPM | |

[1] HYdroxypropoxyl having a 2% aqueous solution viscosity of 35 cps. at 20° C. and sold under the trademark Methocel K-35.
[2] Hydroxypropyl methyl cellulose having a 2% aqueous solution viscosity of 50 cps. at 20° C. and sold under the trademark Methocel E-50.
[3] t-butylperoxyneodecanoate sold under the trademark Lupersol-10 (75% in mineral spirits).

Each of the polymer recipes were polymerized to form a vinyl chloride polymer having an inherent viscosity of about 0.92 and the polymerization was terminated when the reaction pressure dropped about 20 psig from the initial pressure. As can be see seen from the recipes, there were no buffers or strongly alkaline materials present except for the residual alkali remaining from the spray. The initial pH of the recipes was above 7.0 in all cases.

In the runs relating to the process of this invention the general method was to wet the reactor surface with aqueous solutions thoroughly by spraying the walls with the solution designated and then draining the excess from the reactor prior to charging the recipe or by filling the reactor with solution and agitating. Then, where indicated, the reactor surfaces were heated or baked prior to charging the recipes. In the laboratory two procedures were used. In one case, an electric heat gun was applied to the surface of the reactor for a time to dry the surface as evidenced by a whitish appearance. Usually this took about 5 minutes and it was believed the maximum surface temperature reached was about 80° C. (as indicated by "ca."). In another case, the solution was charged to the reactor and the contents heated to 65° C. for 15 minutes.

Each run was evaluated to determine fouling, i.e., the total grams of material deposited upon the reactor surfaces exclusive of loose material were recorded. Tables 1 and 2 below give the results for reactor 1 and reactor 2, respectively. In some cases, a comparison with prior art technology was made. In these cases, a small amount of material, as indicated, was added to the recipe.

TABLE 1
WALL FOULING REACTOR 1

| RUN | ANTI-FOULING TREATMENT | YIELD | BATCHES | TOTAL FOULING (grams) |
|---|---|---|---|---|
| 1 | Control - no Treatment | 78% 80 77 | 3 | 26.6 |
| 2 | Control - no Treatment | 79% 79% 73% | 3 | 28.0 |
| 3 | Oxalic acid 0.1 gm. in recipe (prior art) pH — 7.0 | 82 76 71 | 3 | 35.9 |
| 4 | Zinc chloride (0.06 gm. in recipe) (prior art) | 80 77 | 2 | 14.0 |
| 5 | 5% NaHCO$_3$ soln. (dried on surface; ca. 80° C. for 5 minutes) | 81 77 80 | 3 | 11.7 |
| 6 | 2.5% NaHCO$_3$ soln. (dried on surface; ca. 80° C. for 5 minutes) | 76 64 | 2 | 26.6 |
| 7 | 2.5% Na$_2$CO$_3$ soln. (dried on surface; ca 80° C. for 5 minutes) | 79 80 77 | 3 | 26.6 |

TABLE 2
WALL FOULING REACTOR 2

| RUNS | ANTI-FOULING TREATMENT | YIELD | BATCHES | TOTAL FOULING (grams) |
|---|---|---|---|---|
| 1 | Control - no treatment | 78 70 | 2 | 55.3 |
| 2 | Control - no treatment | 67 69 | 2 | 52.4 |
| 3 | 0.1 N sodium borate (pH buffer 9.0) | 78 78 | 2 | 12.2 |
| 4 | Ascorbic acid (0.6 g in recipe; pH 7.0) | 76 76 | 2 | 17 |
| 5 | 5% NaHCO$_3$ soln. (dried on surface; ca. 80° C. for 5 minutes) | 81 79 | 2 | 5.2 |
| 6 | 25% Na$_2$CO$_3$ (dried on surface; ca. 80° C. for 5 minutes) | 79 82 | 2 | 6.2 |
| 7 | 10% Na$_2$CO$_3$ (dried 80° C. for 5 minutes) | 80 | 2 | 9.4 |
| 8 | 25% Na$_2$CO$_3$ soln. (65° C. × 15 minutes - not dried) | 80 79 | 2 | 7.2 |
| 9 | 5% Na$_2$CO$_3$ soln. (65° C. × 15 minutes - not dried) | 78 82 | 2 | 5.5 |
| 10 | 2.5% Na$_2$CO$_3$ soln. (65° C. × 15 minutes - not dried) | 81 81 | 2 | 6.4 |
| 11 | 1.25% Na$_2$CO$_3$ soln. (65° C. × 15 minutes - not dried) | 77 76 | 2 | 7.4 |
| 12 | 0.625% Na$_2$CO$_3$ soln. (65° C. × 15 minutes - not dried) | 80 78 | 2 | 8.3 |
| 13 | 2.5% NaHCO$_3$ dried on surface; 80° C. for 5 minutes | 78 78 | 2 | 12.3 |

The results in Tables 1 and 2 show that sodium bicarbonate and sodium carbonate are effective for reducing wall fouling in stainless steel reactors by the production of polyvinyl chloride homopolymer. Where the solution was sprayed onto the reactor wall and then dried, better results were obtained. The results also show that sodium carbonate is particularly effective in reducing wall fouling at low percentages, e.g., compare the 1.25–5% level of sodium carbonate verses the higher proportion of sodium bicarbonate. These results are deemed to be excellent based on the small amount of sodium carbonate used.

When comparing the results obtained in Tables 1 and 2 against the prior art techniques, e.g. runs 3 and 4 in Table 1, and runs 3 and 4 in Table 2, it is noted the results appear to be at least as good, if not better, in most instances. This factor does not even consider the simplified and more inexpensive method for reactor treatment.

EXAMPLE 3

A vinyl chloride-vinyl acetate copolymer was prepared in Reactor 1 by the method in Example 1 except by polymerizing the following recipe:

| | |
|---|---|
| Water | 600 grams |
| Vinyl Acetate | 15 grams |
| Vinyl Chloride | 285 grams |
| Hydroxypropyl methyl cellulose (Methocel K-35) | 0.5 grams |
| Trichloroethylene | 2.19 grams |
| azo bis-losovaleronitrilie | 0.20 grams |
| Polymerization Temp. | 75° C. |
| Agitation; 500 rpm | 0.15 grams |

The fouling results after two runs of a control batch were 22.5 grams with a yield of 87 and 85%, respectively. On the other hand, where the reactor was pretreated with a 25% sodium carbonate solution in water and subsequently dried at 85° C. for five minutes, the fouling after 2 batches was 12.7 grams. The yield was 88 and 87%, respectively. When the surface was treated with a 0.65% sodium carbonate solution in water and dried at 80° C. for 5 minutes, the fouling after 2 batches was 21.0 grams. Although the results in reducing wall fouling are not as dramatic as in the case of Example 1 in producing polyvinyl chloride homopolymer, the results do show that wall fouling was reduced by about 50% at high concentration of sodium carbonate, and slightly at the low end of the scale.

What is claimed is:

1. In a suspension polymerization process wherein a recipe comprising vinyl chloride or a mixture of vinyl chloride and another vinyl monomer, water, a suspension agent, and a monomer soluble polymerization catalyst is charged to a stainless steel reactor at an initial pH of 6.0 or above, and subsequently polymerized at an elevated temperature to produce a vinyl chloride containing polymer, the improvement for reducing wall fouling in said stainless steel reactor which comprises:
    (a) wetting the internal reactor surface with a solution comprising a solvent and an alkaline material selected from the group consisting of alkali metal carbonates and alkali metal bicarbonates, said carbonate material being incorporated in said solution in a proportion of from about 1.25 to 25% by weight and said bicarbonate being incorporated in said solution in a proportion of from about 5 to 25% by weight and
    (b) heating the wet reactor surface to a temperature of 40°–100° C. for a period of at least five minutes prior to charging the recipe to the reactor.
2. The process of claim 1 wherein said alkali metal in said alkali metal carbonates and alkali metal bicarbonates is selected from the group consisting of sodium, potassium, and lithium.
3. The process of claim 1 wherein said alkaline material is a carbonate.
4. The process of claims 2 or 3 wherein the said solvent is selected from the group consisting of a lower alkanol having from one to four carbon atoms and water, and said polymer is a vinyl chloride homopolymer.
5. The process of claim 3 wherein said solvent is water.
6. The process of claim 2 wherein said alkali material is a bicarbonate.
7. The process of claim 6 wherein said solvent is water.
8. The process of claim 5 or 7 wherein said suspending agent is hydroxypropyl methyl cellulose having a 2% solution viscosity of from 20–100 cps.
9. The process of claim 8 wherein said polymer is a vinyl chloride homopolymer.

* * * * *

United States Patent and Trademark Office

CERTIFICATE OF CORRECTION

PATENT NO. : 4,224,424
DATED : 23 September 1980
INVENTOR(S) : Bernard D. Bauman It is certified that error appears in the above-identified patent and that said Letters Patent are hereby corrected as shown below:

Column 5, line 28, delete "$^1$Hydroxyproxyl" and replace by -- $^1$Hydroxypropyl methyl cellulose --

Column 6, Table 1, Under Heading Yield, line 15, add -- 71 --

Column 6, Table 1, Under Heading Batches, line 15, delete "71"

Column 6, Table 2, Under Heading Yield, line 47, add -- 77 --

Signed and Sealed this

Thirty-first Day of March 1981

[SEAL]

Attest:

RENE D. TEGTMEYER

Attesting Officer

Acting Commissioner of Patents and Trademarks